United States Patent [19]

Bringol et al.

[11] 4,456,966
[45] Jun. 26, 1984

[54] MEMORY SYSTEM WITH FLEXIBLE REPLACEMENT UNITS

[75] Inventors: Charles R. Bringol; Wilbert L. Kroeger, III, both of Austin, Tex.

[73] Assignee: International Business Machines Corporation, Armonk, N.Y.

[21] Appl. No.: 238,400

[22] Filed: Feb. 26, 1981

[51] Int. Cl.³ ............................................. G06B 11/00
[52] U.S. Cl. .................................................... 364/900
[58] Field of Search ... 364/200 MS File, 900 MS File; 371/10

[56] References Cited

U.S. PATENT DOCUMENTS

| | | | |
|---|---|---|---|
| 3,659,275 | 4/1972 | Marshall | 364/200 |
| 3,748,653 | 7/1973 | Debruyne et al. | 365/200 |
| 3,755,791 | 8/1973 | Arzubi | 365/200 |
| 3,934,227 | 1/1976 | Worst | 364/200 |
| 4,025,901 | 5/1977 | Bachman et al. | 364/200 |
| 4,028,678 | 6/1977 | Moran | 364/900 |
| 4,028,679 | 6/1977 | Divine | 364/900 |
| 4,028,683 | 6/1977 | Divine et al. | 364/900 |
| 4,028,684 | 6/1977 | Divine et al. | 364/900 |
| 4,047,163 | 9/1977 | Choate et al. | 365/96 |
| 4,141,068 | 2/1979 | Mager et al. | 364/200 |
| 4,150,428 | 4/1979 | Inrig et al. | 364/200 |
| 4,340,932 | 7/1982 | Bakula et al. | 364/200 |

Primary Examiner—Felix D. Gruber
Assistant Examiner—Tim A. Wiens
Attorney, Agent, or Firm—J. B. Kraft

[57] ABSTRACT

A read only memory system with replaceable units is provided in which the replacement units have a variable capacity. In addition, the system is sufficiently flexible so that a replacement unit substituted for an original unit may subsequently be removed from the system once and the original unit restored. The read only memory system has a fixed main read only memory with a plurality of addressable units of uniform capacity in combination with a substitute memory of a greater capacity than the addressable units. A control is provided with the capability of selectively disabling units of a fixed memory. It also can selectively enable a portion of the substitute memory and substitute the enabled portion for a disabled fixed memory unit. The control is also capable of selectively varying the capacity of the substituted enabled unit.

6 Claims, 2 Drawing Figures

MEMORY SYSTEM WITH FLEXIBLE REPLACEMENT UNITS

BACKGROUND OF THE INVENTION

1. Field of the Invention

This invention relates to data processing apparatus and more particularly to data processing apparatus having fixed read only memories. The invention especially relates to apparatus for providing substitutions and corrections for errors or oversights in such fixed read only memories.

2. Description of the Prior Art

With the advancement of large scale integrated circuit technology toward providing faster, more efficient and less costly integrated circuit data processing memory elements, the data processing technology has been advancing in the direction of using fixed read only memory structures formed from large scale integrated circuits in place of the earlier and traditional units of random access memory which could be programmed and reprogrammed as desired to effect changes. In contrast, the read only memories (ROMS) are hard wired, i.e., preprogrammed in advance and cannot be changed. This, of course, has led to some difficulties in the data processing technology since errors can occur in the design and preprogramming of such ROMS, and operational needs cannot always be conceived in advance. This requires changes in the ROM memory to be made even in the field.

When the need for substitution or change arises, the costly approach would be to replace the undesired ROM memory structures with redesigned or changed structures. Such approaches require remanufacture. They can be relatively costly, particularly when the replacement has to be made on a considerable number of data processors. Also, they are slow because the replacements often take months to redesign and remanufacture. Accordingly, the technology has moved in a direction of field alterable units such as that described in U.S. Pat. No. 3,934,227 in which a mapping memory is provided which is connected to both the overlay memory and a fixed memory. The mapping memory is addressed simultaneously with the fixed ROM memory and the overlay memory. When so addressed, the mapping memory makes the decision as to whether a fixed memory unit should be used or a unit from the overlay memory substituted therefor. These mapping memories are preprogrammed to predetermine these decisions.

While such overlay memory units provide a solution to the problem of patching corrections into fixed ROMS in the field, they are generally limited in their flexibility and provide essentially for "one for one" substitution. They are also limited in their flexibility. In addition, once a substitution or patch is put in, it can never be undone again.

SUMMARY OF THE PRESENT INVENTION

The present invention expands the capability of field substitutable memory apparatus over that of the prior art. The present apparatus has the capability of substituting for a selectively disabled portion of a fixed memory with a substituted portion having a variable memory capacity. The present apparatus has the further capability of subsequently disabling the substitute or replacement memory portion and reenabling the original memory unit in a one time change only.

The read only memory system of the present invention achieves these results with apparatus comprising a fixed main read only memory having a plurality of addressable units of uniform capacity in combination with a substitute memory means having a greater capacity than any of the addressable units, and control means which comprise means for selectively disabling units of a fixed memory and means for selectively enabling a portion of the substitute memory and for substituting this enabled portion for disabled fixed memory unit.

The apparatus further includes means for selectively varying the capacity of the substituted enabled portion. In order to accomplish this variation in the capacity of the enabled portion of substitute memory, the present apparatus includes means for addressing a desired sequence of the addressable units in the fixed memory, these addressing means being adapted to simultaneously address the control means. As mentioned above, the control means have the capability of selectively disabling units of the fixed memory and selectively enabling a portion of the substitute memory to replace the disabled fixed memory unit. The control means are able to accomplish the variation in the capacity of the substituted replacement unit through means which operate after an initial substitution to activate the addressing means to apply one or more addresses to only the substitute memory and not to the disabled unit fixed memory. In this manner, additional portions of the substituted memory are also substituted for the disabled fixed memory unit to thereby vary the capacity of the total portion of substitute memory.

In addition, in order to give the apparatus the capability of disabling, when necessary, the portion of substitute memory and returning the initially disabled fixed memory unit into operational status in the system, the present invention provides an expedient wherein the means for selectively enabling portions of the substitute memory and the means for selectively disabling portions of the fixed memory are provided by a programmable read only memory unit which is alterable only twice, i.e., first to disable a selected fixed memory unit and to enable a portion of the substitute memory, and second to reenable the disabled unit and to disable the previously enabled substitute memory portion.

BRIEF DESCRIPTION OF THE DRAWINGS

Referring now to the drawings, wherein a preferred embodiment of the invention is illustrated, and wherein like reference numerals are used throughout to designate like parts.

DETAILED DESCRIPTION OF THE PREFERRED EMBODIMENT

Figure 1:
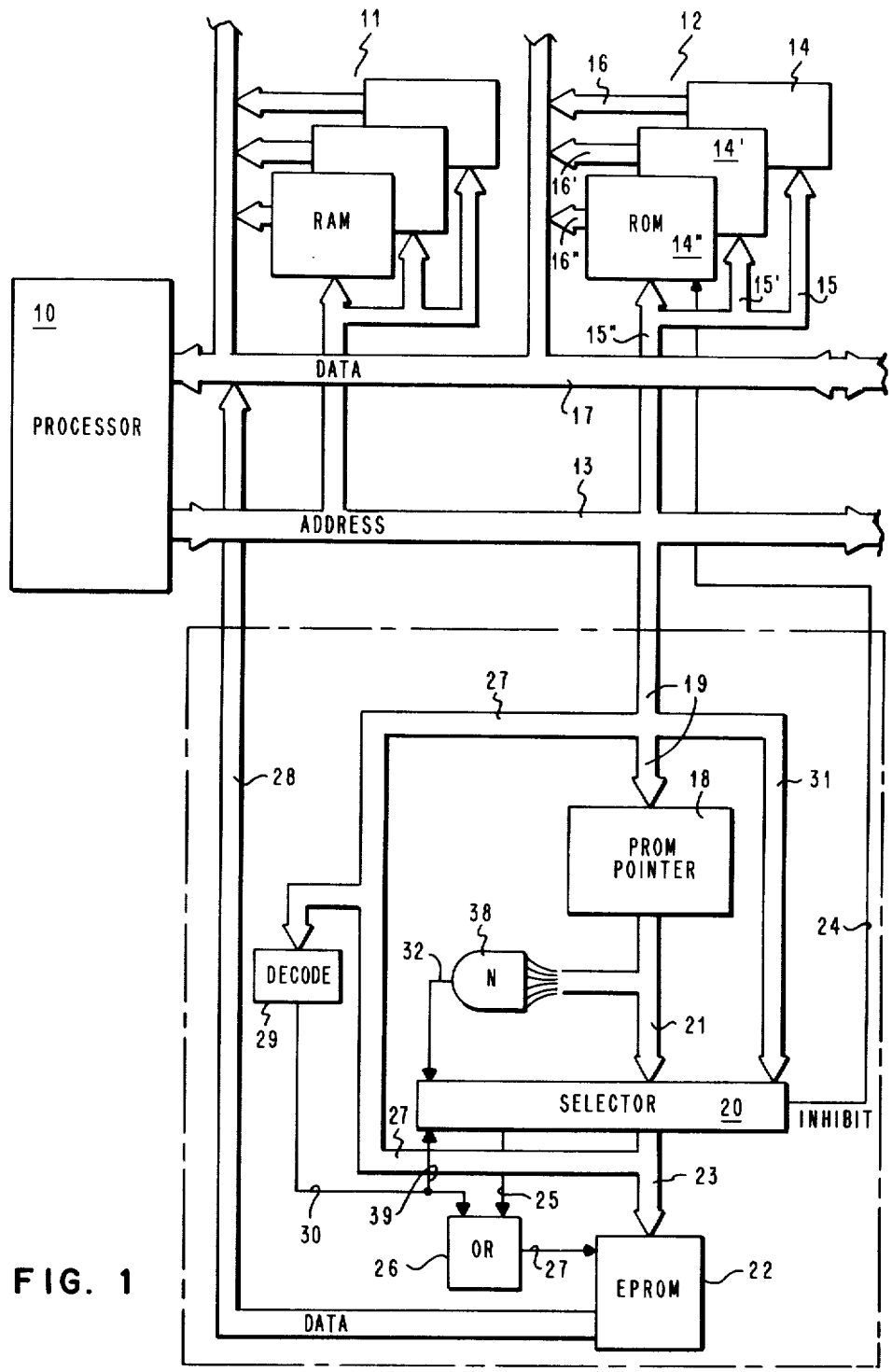
FIG. 1 is a block diagrammatic representation of the memory system of the present invention.

With reference to FIG. 1 which is a block diagrammatic representation of the memory system of the present invention, preferred embodiment of the present invention will now be described. The central processor 10 which controls the memory system of the present invention may be any conventional central processing unit such as the 8085 microprocessor marketed by Intel or the 6800 microprocessor marketed by Motorola. It addresses a variety of storage means including RAM storage 11 and ROM storage 12 through an address buss 13 which for purposes of the present invention is a 16 bit parallel buss. The particular blocks 14, 14' and 14" in the ROM memory which are addressed through busses 15, 15' and 15", respectively, return the data stored at the addressed ROM position to the central processor via busses 16, 16' and 16", which communicate with data buss 17 to return the data to the central processor. For purposes of the present illustration, data buss 17 is an 8 bit parallel buss. The address which is applied to the ROM storage 12 is also applied from address buss 13 to PROM pointer 18. PROM pointer 18 is a programmable read only memory which monitors the address applied thereto on buss 19 from address buss 13. In the present embodiment, ten of the sixteen parallel address bits are applied to PROM pointer 18. The PROM pointer 18 has been preprogrammed to determine whether or not each address which it monitors represents a block in the ROM memory 12 which should be substituted for. When it is predetermined that a substitution should be made, the address of the ROM block to be substituted for is preprogrammed into the PROM 18. In order to be suitable for such preprogramming, the PROM 18 may be any conventional memory unit which can be physically programmed, i.e., hard wired in the field. Typical of said hard wirable PROM memories are 82S115 marketed by Signetics or MCM 10149 marketed by Motorola. They are both fusable link PROMS. The programming or hard wiring is usually accomplished by physical means such as fusing selected internal links with an induced current to burn in a particular binary pattern.

For purposes of this illustration, the PROM pointer 18 monitors the ten high order bits, i.e., bits 6-15 of the address bus. Also, for purposes of illustration this PROM has eight output data bits. If the seventh data bit position is a binary "1" for a particular input address, this means that the block in the ROM 12 being addressed by the particular address is to be substituted for. The remaining six data bits will provide the address from the PROM pointer 18 to the selector 20 over buss 21 which will permit the selector to address the appropriate substitute address in the EPROM memory unit 22 which the selector addresses through buss 23. When such a substitution is to be made, in addition to participating in the selection in the EPROM memory 22, the selector also provides a signal to the appropriate block position, e.g., 14" in ROM memory 12 over inhibit line 24 which will inhibit the block to be substituted for. Also, the selector provides an activate signal over line 25 which passes through OR gate 26 and is applied over line 27 to EPROM 22 to activate the EPROM. When the EPROM 22 is thus activated, the address being applied through buss 19 is also being applied to EPROM 22 via buss 27. This, in combination with the data being applied to EPROM 22 via buss 23 from selector 20, results in the selection of the substitute block in EPROM 22 which is then applied from EPROM 22 via buss 28 feeding into data buss 17 back to processor 10. Thus, the substitute block from EPROM 22 is applied to the processor rather than the original block from ROM 12.

It should be noted that EPROM is an erasable programmable read only memory. An EPROM can be electrically programmed by providing appropriate control signals to the device which cause an electrical charge to be trapped in the floating gate of selected internal memory elements. This selective process allows the required binary patterns to be defined at each address. The programmed patterns can be erased by placing the EPROM device under an ultraviolet lamp of appropriate intensity and wave length for a specified length of time. This will remove the trapped charge on the gates. An EPROM can be erased and reprogrammed many times. Typical examples of EPROMs are the MCM 2708 marketed by Motorola and the 2716 marketed by Intel.

Both PROM and EPROM memory structures are described in detail in the article, "Consider all Options in PROM Programmers," EDN, May 5, 1979, pp. 101-106.

Normally, the replacement sequence just described is followed by a routine sequence, i.e., the next address is applied from the processor 10 onto address buss 13 from which it is in turn applied to both the ROM memory 12 and to the PROM pointer 18 in order to determine whether or not the next address block is to be replaced or substituted for. However, the present apparatus has the further capability of bypassing or holding such a next subsequent step in abeyance after an initial step wherein a block from the ROM memory 12 has been substituted for by a block from the EPROM memory 22. This procedure is followed when substitute memory from the EPROM is to have a greater capacity than, i.e., expand upon the block in the ROM memory 12 which is being substituted for. In such a case, the data which is forwarded from the EPROM memory 22 along buss 28 back to processor 10 involves an instruction or a series of instructions which cause the processor to bypass the PROM pointer 18 with its next address. In such a case, the address from the processor which is applied to buss 27 from address buss 13 and buss 19 contains information which activate decode means 29 to apply a signal along line 30 to OR gate 26, and the selector which directly enables EPROM memory 22 without going through PROM pointer 18. It also causes selector 20, through a signal on line 39, to continue to inhibit the previously inhibited block in ROM memory 12 by means of the application of a signal on inhibit line 24 from selector 20. At the same time, data from the processor applied via address buss 13, buss 19 and buss 31 is applied directly to the selector without passing through the PROM pointer 18.

The data on buss 31 serves the function of the data on previously described buss 21 from the PROM pointer to cause the selector to provide on buss 23 part of the address of the next block of data in EPROM 22 which is then passed back to the processor along buss 28 as expanded substitute data for the block in ROM memory 12 which continues to be disabled. This cycle may be continued with the PROM pointer being bypassed through buss 31 directly from processor 10 until the substitute data has been expanded to the desired size. At this time, normal procedure of the processor applying addresses via address buss 13 to both the ROM memory 12 via busses 15-15" and to the PROM pointer 18 via buss 19 is resumed.

By a relatively simple expedient which will be hereinafter described in detail, the apparatus of the present invention has the capability of, on a one time basis, undoing any substitution programmed into the PROM pointer so that the initial block of memory substituted for is reinstated. As stated above, the PROM pointer monitors the ten high order bits, i.e., bits 8-15 of the address. If the 7th bit position of the PROM data bus for the input address is a binary "1", this means that the block in the ROM 12 being addressed by the particular address from the processor is to be substituted for, and the remaining six data bits will provide the address from the PROM pointer to the selector over buss 21 which will permit the selector to address the appropriate substitute address in the EPROM memory unit 22 which the selector addresses through buss 23. It is initially assumed that the PROM pointer is to be programmed to make such a substitution. Initially, the PROM pointer location which is to be addressed by a particular address has the configuration:

$$\text{PROM Output:} \frac{7^{th}}{0} \frac{6^{th}}{0} \frac{5^{th}}{0} \cdots \frac{\emptyset^{th}}{0}$$

Since there is a zero at the seventh position, there will be no substitution. However, since a substitution is desired, the PROM pointer location is preprogrammed by the means described above so that it has a configuration like the following wherein the seventh position is now occupied by a binary "1". This means that a substitution is to be made and the remaining ∅-6 bit positions have a binary pattern which will cause selector 20 to select the address in EPROM 22 of the block to replace the block in ROM 12 to be substituted for:

$$\frac{7^{th}}{1} \frac{6^{th}}{0} \frac{5^{th}}{1} \cdots \frac{\emptyset^{th}}{1}$$

Now suppose it is desired to undo this substitution. Then, the address coding in the PROM pointer 18 is reworked so that there will be a one bit at everyone of the eight bit positions (0-7). This is shown as follows:

$$\frac{7^{th}}{1} \frac{6^{th}}{1} \frac{5^{th}}{1} \cdots \frac{\emptyset^{th}}{1}$$

The PROM pointer has this flexibility since it is possible to change every bit position from a binary "0" to a binary "1". Accordingly, in undoing a substitution all that is necessary is to change any remaining "0"s to binary "1"s. Where such a binary "1" pattern appears, NAND gate 38 which monitors the pattern will produce a signal on line 32 which will stop the select means from operating. Thus, there will be no inhibit signal on line 24, and the initial ROM block which was substituted for will again be enabled. In addition, there will be no activating signal on line 24 from selector 20, and the EPROM 22 will remain inactive.

Figure 2:
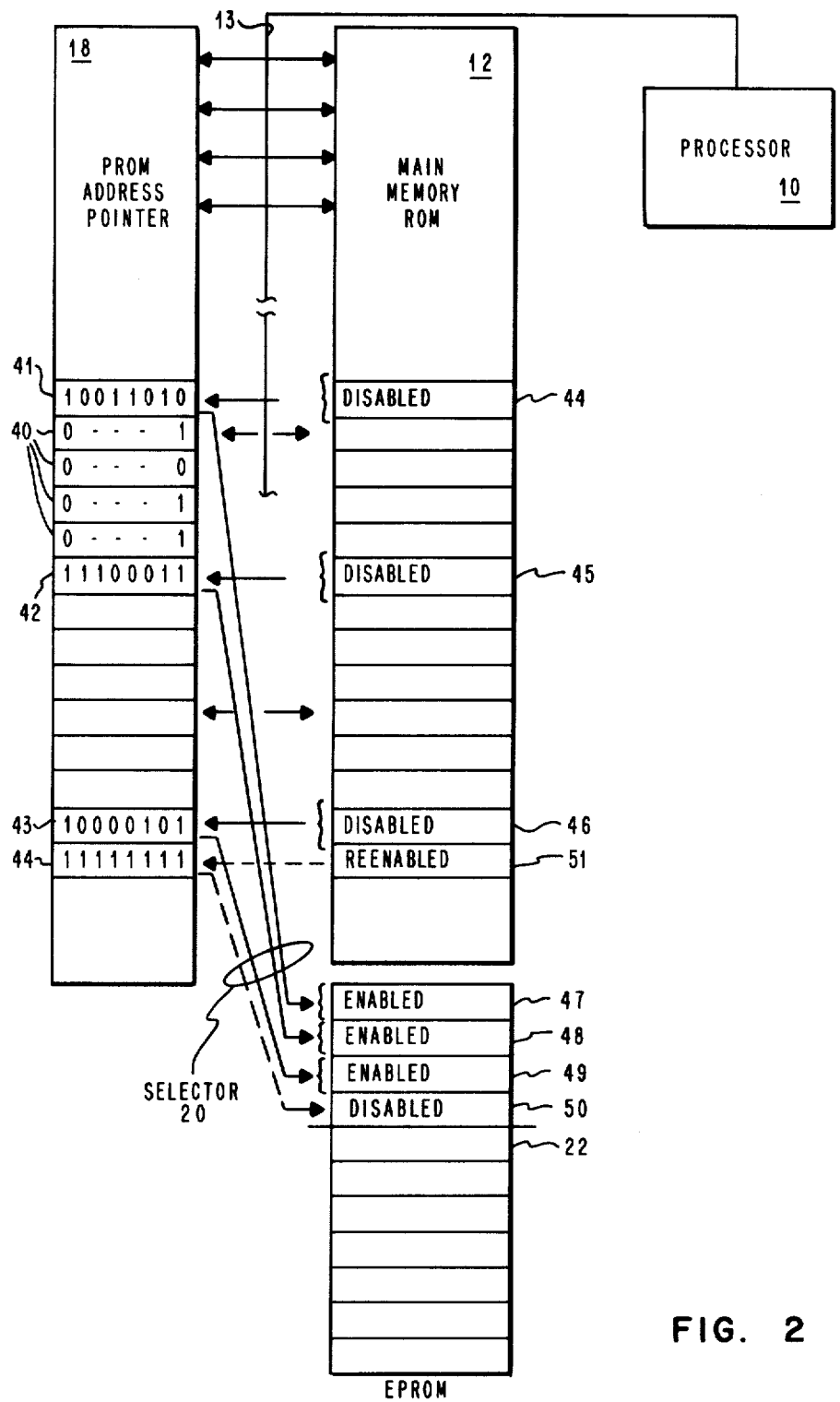
FIG. 2 is a diagrammatic representation of the main ROM memory, the PROM block address pointer and the EPROM replacement memory, diagrammatically arranged to show how three blocks of the ROM memory may be substituted for by three replacement blocks from the EPROM memory.

Now with reference to FIG. 2, the previously described procedure will be illustrated diagrammatically in order to show the relationship of the PROM pointer 18, the main ROM memory 12 and the EPROM substitute memory 22. As the processor sends addresses down the address buss 13 to address various locations in the main ROM 12, it simultaneously addresses corresponding locations in the PROM pointer 18 in order to determine whether the addressed ROM memory location is to be substituted for. The PROM pointer location has a preprogrammed 8 bit binary pattern indicative of whether a substitution is to be made and if such a substitution is to be made, which unit of the EPROM memory 22 is to be substituted. If the corresponding location in the PROM pointer 18 has binary representations commencing with a "0" such as locations 40, then there is no substitution. However, if the corresponding locations in the PROM pointer such as locations 41, 42 and 43 commence with a binary "1", the selector 20 disables the address location in the main ROM memory 12, i.e., corresponding locations 44, 45 and 46 and enables substitute locations respectively designated 47, 48 and 49 in the EPROM memory 22. Also illustrated is a situation where a previously enabled location in the EPROM memory 50 has been disabled by converting the binary pattern in the PROM pointer to all "1"s, i.e., at location 44 resulting in the disabling of the EPROM location 50 and the reenabling of the original location 51 in the ROM memory which was substituted for as indicated by the set of dotted lines.

While the invention has been particularly shown and described with reference to a preferred embodiment it will be understood by those skilled in the art that various other changes in form and detail may be made without departing from the spirit and scope of the invention.

What is claimed is:

1. A read only memory system with replaceable units comprising:
   a fixed main read only memory having a plurality of addressable units of uniform capacity,
   substitute memory means having a greater capacity than each of a plurality of said addressable units, and
   control means comprising
   means for selectively disabling units of said fixed memory comprising
   means for monitoring a group of input binary bits associated with each unit of a fixed memory, all of which bits are in the same first of two binary states when a unit is functional and in different binary states when a fixed memory unit is to be disabled,
   means for selecting and enabling a portion of said substitute memory having a selected capacity different from the capacity of one of said disabled units,
   means for substituting said enabled portion for said one disabled memory unit, and
   means for re-enabling any selected disabled unit wherein all of the bits in the group of binary bits associated with said disabled unit are placed in the same unalterable second of said two binary states.

2. A read only memory system with replaceable units comprising:
   a fixed main read only memory having a plurality of addressable units,
   substitute memory means having a greater capacity than each of a plurality of said addressable units,
   control means for selectively substituting for said read only memory units,
   means for addressing a desired sequence of said addressable units, said addressing means simultaneously addressing said control means, and
   said control means comprising
   means responsive to a selected binary bit address for selectively disabling units of said fixed memory when the binary bits in said selected address are in different binary states,
   means responsive to a selected address for selecting and enabling a portion of said substitute memory having a selected capacity different from the capacity of one of said disabled units, and
   means for substituting said enabled portion for said one disabled memory unit, and means for re-enabling any selected disabled unit by placing all of the bits in said selected address in an inalterable "one" binary state.

3. The read only memory system of claim 1 wherein said substituted portion has a greater capacity than said disabled portion.

4. The read only memory system of claim 1 wherein said means for selecting and enabling and means for selectively disabling form a programmable read only memory unit.

5. The memory system of claim 2 wherein said means for selecting and enabling a portion of said substitute memory having a selected capacity comprise means for activating said addressing means to apply at least one address to only said substitute memory subsequent to an initial substitution whereby an additional portion of said substitute memory is also substituted for said disabled fixed memory unit.

6. The read only memory system of claim 5 wherein said means for selecting and enabling and means for selectively disabling form a programmable read only memory unit.

* * * * *